United States Patent [19]

Duperray et al.

[11] Patent Number: 5,206,215
[45] Date of Patent: Apr. 27, 1993

[54] PROCESS FOR OBTAINING PRECURSORS FOR HIGH CRITICAL TEMPERATURE SUPERCONDUCTOR CERAMICS COMPRISING A FIRST AND SECOND PRECIPITATION

[75] Inventors: Gérard Duperray, La Norville; Françoise Ducatel, Bonnelles, both of France

[73] Assignee: Alcatel Alsthom Compagnie Generale d'Electricite, Paris, France

[21] Appl. No.: 850,926

[22] Filed: Mar. 13, 1992

[30] Foreign Application Priority Data

Mar. 18, 1991 [FR] France ................... 91 03260

[51] Int. Cl.$^5$ .............. C01B 13/36; C01F 11/02; C01G 3/02
[52] U.S. Cl. ........................ 505/1; 423/593; 505/738
[58] Field of Search ............ 505/738, 1; 423/43, 423/593, 604, 635

[56] References Cited

U.S. PATENT DOCUMENTS

| | | | |
|---|---|---|---|
| 2,726,953 | 12/1955 | Roy | 423/43 |
| 3,736,125 | 5/1973 | Wilder | 423/43 |
| 3,915,690 | 10/1975 | Ammann | 423/593 |
| 4,839,339 | 6/1989 | Bunker | 505/1 |
| 4,895,832 | 1/1990 | Chang | 505/738 |
| 5,077,265 | 12/1991 | Ritter | 505/738 |
| 5,152,973 | 10/1992 | Spencer | 505/738 |

FOREIGN PATENT DOCUMENTS

| | | | |
|---|---|---|---|
| 0033017 | 2/1989 | Japan | 505/738 |
| 3-028123 | 2/1991 | Japan | 505/738 |

OTHER PUBLICATIONS

Japanese Journal of Applied Physics, vol. 26, No. 5, May 1987, Tokyo JP Keiji Kaneko: 'On the Coprecipitation Method for the Preparation of High Tc M-X-Cu-O (M=Ba, Sr, X=La, Y) System'.

Physica C., vol. 157, No. 1, Jan. 1, 1989, Amsterdam, NL; Yu Zhang: "The Synthesis of Superconducting Bismuth Compounds via Oxalate Coprecipitation".

Chemical Abstracts, vol. 113, No. 12, Sep. 17, 1990, Columbus, Ohio, US; Abstract No. 107249s, Liu Lingging: 'Preparation of Superconductors of the Yttrium Barium Copper Oxide System by the Oxalate Method'.

*Primary Examiner*—Paul Lieberman
*Assistant Examiner*—John Boyd
*Attorney, Agent, or Firm*—Sughrue, Mion, Zinn, Macpeak & Seas

[57] ABSTRACT

A process for obtaining precursors for high critical temperature superconductor ceramics by precipitating salts which are insoluble in water comprises the following stages: A starting solution of soluble salts is prepared in which the cations are in the stoichiometric proportions of the required superconductor phase. A first full precipitation is carried out of a first series of cations at a first value of pH. The first precipitates obtained is filtered out and washed and the filtrate is retained. The pH of the filtrate is changed to a second value and the residual cations are precipitated. The second precipitate is filtered. The first and second precipitates are homogenized. The product obtained is dried, calcined, and ground.

8 Claims, No Drawings

PROCESS FOR OBTAINING PRECURSORS FOR HIGH CRITICAL TEMPERATURE SUPERCONDUCTOR CERAMICS COMPRISING A FIRST AND SECOND PRECIPITATION

BACKGROUND OF THE INVENTION

1. Field of the invention

The presents invention concerns a process for obtaining precursors for high critical temperature superconductor ceramics for synthesizing superconductor ceramics under optimum conditions of reactivity, yield and homogeneity.

2. Description of the Prior Art

In a prior art method, before synthesis proper, a mixture of precursors is prepared in the form of very fine grains (diameter less than 0.3 mm) by coprecipitation; starting with a solution of the required cations, the precursors are precipitated in the form of salts which are insoluble in water such as oxalates, carbonates, tartrates, citrates, etc. The precipitate obtained in this way is then filtered, washed and calcined at a temperature between 500° C. and 600° C. There results a spongy mass of carbonate or oxide cations which after brief grinding yields a powder consisting of agglomerates of very fine grains with a chemical composition which is highly homogeneous on the microscopic scale; in other words, each agglomerate has the required stoichiometry. From this point of view this process represents a major advance over the grinding of oxides or carbonates prepared separately.

However, a method of this kind applied to the coprecipitation of precursors for superconductor ceramics based on yttrium or bismuth in practise raises problems as described in the following articles:

Mat. Res. Bull vol 23, 1988, 1273 —F. Caillaud
Mat Lett. vol 2, 3, 1990, 105 —C. Y. Shei.

The working solutions contain a number of unwanted anion and soluble complexes which impede the process of precipitation and can very seriously reduce the yield.

For example, in an acid medium there appear relatively soluble alkaline earth complexes such as

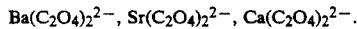

Likewise, in the presence of ammonium a highly soluble copper complex $Cu(NH_3)_4^{2-}$ appears.

Also, if the pH is greater than 2, the bismuth dissolves again in the form of bismuthite ions $Bi_2O_4^{2-}$.

Consequently, if the working solution is neutralized with a non-polluting volatile base such as ammonia or an amine, the copper and the bismuth cannot be fully precipitated because of the alkaline earths and vice versa if the working solution is acidified. Whatever the range of pH of the solution employed, the precipitate departs from the required stoichiometry and the synthesized superconductor phases are impure. It is known that these impurities result in an unacceptable deterioration in superconductive properties including reduced critical temperature and transport current.

To avoid this problem, as is described in detail in the articles mentioned above, users of the process exercise precise control over the pH of the solution during coprecipitation to obtain conditions under which the yield is maximum; also, from the outset they add to the working solution an excess of cations which cannot be precipitated completely. However, it proves very difficult to judge the excess of cations required because the reduction in the precipitation yield depends on a large number of parameters that are difficult to control simultaneously, especially under industrial conditions: pH, temperature, concentration of each species, precipitation kinetics, etc.

An object of the present invention is to provide a process for obtaining all the precursors with the required stoichiometry and reproducibly even under industrial conditions.

SUMMARY OF THE INVENTION

The present inventions consists in a process for obtaining precursors for high critical temperature superconductor ceramics by precipitating salts which are insoluble in water comprising the following stages:

- a starting solution of soluble salts is prepared in which the cations are in the stoichiometric proportions of the required superconductor phase,
- a first full precipitation is carried out of a first series of cations at a first value of pH,
- the first precipitate obtained is filtered out and washed and the filtrate is retained,
- the pH of said filtrate is changed to a second value and the residual cations are precipitated,
- the second precipitate is filtered,
- the first and second precipitates are homogenized,
- the product obtained is dried, calcined, and ground.

The cations of said first series can be the most preferred cations vis-à-vis said superconductor phase to be obtained.

In a first preferred embodiment, starting with a solution of nitrates in which said cations are in the stoichiometric proportions of the required superconductor phase, the first precipitation is carried out by adding an amine or ammonium oxalate with a first pH value less than or equal to 3, the pH is then raised to a second value greater than 3 and the residual cations are precipitated completely in the form of oxalates.

The present invention applies in particular to the following superconductor phases for which the cations to be precipitated are Yttrium[III], Barium[II], Copper[II], Calcium[II]:

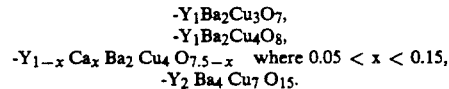

In this case said first precipitate contains all of the yttrium and copper cations and the major part of the barium cations and said second precipitate contains the residual barium cations.

It also applies to the following superconductor phases for which the cations to be precipitated are Bismuth[III], Strontium[II], Calcium[II], Copper[II]:

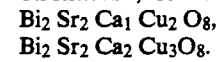

In this case said first precipitate contains all of the bismuth and copper cations and the major part of the strontium and calcium cations and the second precipitate contains the residual strontium and calcium cations.

For the $Bi_{(2-y)}Pb_y Sr_2 Ca_2 Cu_3 O_{10-y/2}$ phase with $0.3 < y < 0.8$ where lead is substituted for some bismuth said first precipitate contains all of the bismuth, copper and lead cations and the major part of the strontium and calcium cations and the second precipitate contains the residual strontium and calcium cations.

For the $Bi_{(2-y)}Sb_ySr_2Ca_2Cu_3O_{10-y}$ phase with $0.3<y<0.8$ where antimony is substituted for some bismuth said first precipitate contains all the bismuth, copper and antimony cations and the major part of the strontium and calcium cations and the second precipitate contains the residual strontium and calcium cations.

In another embodiment applicable essentially to the aforementioned bismuth-containing superconductor phases, the starting solution is the same solution in which the cations are in the stoichiometric proportions of the required phase; the first precipitation is carried out at a pH of at least 3 by adding an amine or ammonium oxalate; the filtrate is acidified to precipitate the residual cations.

The first precipitate then contains all of the strontium and calcium and the major part of the bismuth and copper and the second precipitate contains the residual bismuth and virtually all the residual copper.

In all embodiments of the process in accordance with the invention ideal coprecipitation of all the cations is dispensed with in favor of precipitation yield.

The second precipitate, very much smaller in quantity than the first, is added to the latter; the combination may be dispersed in a little water and homogenized by appropriate means such as ultrasonic agitation, by means of a mill, dispersion in a ball mill. A final filtration stage may then be needed to recover all of the oxalates. The product obtained is dried in air at around 100° C. and calcined for one hour in air at a temperature between 500° C. and 600° C.

The resulting spongy mass is made up of metal oxides except for the alkaline earths which are in the form of carbonates. Said spongy mass is dry ground for one hour and screened. This produces a powder with particle sizes between 0.3 $\mu m$ and 10 $\mu m$ which is suitable for the various processes for shaping superconductor ceramics.

The powder can be used directly and pressed uniaxially or isostatically; it can be extruded or injection molded after milling it with a polymer; it can be milled in a liquid and a soluble binder added and subsequently cast-silkscreened.

In all cases, the ceramic obtained after the conventional thermal synthesis is truly stoichiometric, which guarantees good superconductive performance.

Other features and advantages of the present invention will emerge from the following description of non-limiting illustrative examples.

EXAMPLE 1

11.29 g of $Y_2O_3$, 39.47 g of $BaCO_3$ and 23.86 g of CuO are placed in suspension in 100 ml of water. 158 g of 52% $HNO_3$ is added while stirring. After dilution to 500 ml and heating to 80° C. a clear blue solution is obtained.

100 g of dihydrated oxalic acid are dissolved separately in 50 ml of water at 80° C.; this solution is carefully neutralized with 163 g of triethylamine until a clear solution is obtained.

The blue solution is added slowly to the solution of triethylamine oxalate whilst vigorously stirring at 80° C. The pH is adjusted to 2.5 by adding triethylamine and the mixture is cooled while stirring to 10° C. An abundant bluish first precipitate is obtained containing all of the yttrium and copper and most of the barium.

The first precipitate is filtered out and washed and the filtrate is retained. The filtrate is neutralized to a pH value of 5 with ammoniaical solution; a white second precipitate is obtained containing the residual barium. The second precipitate is filtered out and washed.

The two precipitates are mixed in suspension in 100 ml of water with thirty minutes of ultrasonic agitation and one hour of milling in a polyethylene flask containing two PTFE balls.

The homogenized precipitate is filtered out and washed and dried in air in an oven at 120° C. and then calcined for one hour at 600° C. in air. The spongy mass obtained is dry ground for one hour in a corundum jar containing two balls. The result is screened using a 250 $\mu m$ mesh.

This material when pressed into bar form and heat treated as described in French patent FR-A-89 08822 yields the orthorhombic $Y_1Ba_2Cu_3O_{7-x}$ superconductor phase.

EXAMPLE 2

11.29 g of $Y_2O_3$, 39.37 g of $BaCO_3$ and 31.82 g of Cu are placed in suspension in 100 ml of water. 182 g of 52% $HNO_3$ is added while stirring. After dilution to 500 ml and heating to 80° C. a clear blue solution is obtained.

120 g of dihydrated oxalic acid are dissolved separately in 60 ml of water at 80° C.; this solution is carefully neutralized with 195 g of triethylamine until a clear solution is obtained.

The remaining stages are identical to those for example 1.

The first precipitate contains all the yttrium and copper and most of the barium.

The second precipitate contains the residual barium.

The material obtained when treated as described in French patent FR-A-91 01892 yields the pure $Y_1Ba_2Cu_4O_8$ superconductor phase. First the orthorhombic $Y_1Ba_2Cu_3O_7$ phase is synthesized, the excess CuO being dispersed in this phase; heat treatment is then carried out in pure oxygen at a pressure of one bar and at a temperature between 800° C. and 850° C. for a time between 60 and 100 hours. The use of precursors precipitated by the process of the present invention contributes to the obtaining of this 2:4:8 phase in oxygen at atmospheric pressure, whereas pressures of 50 bars or greater are usually employed. The reason is that the copper, entirely precipitated in the first stage, is dispersed optimally between the precursors and diffuses faster into the $Y_1Ba_2Cu_3O_7$ structure to form $Y_1Ba_2Cu_4O_8$.

EXAMPLE 3

18.64 g of $Bi_2O_3$, 4.46 g of PbO, 14.76 g of $SrCO_3$, 10.00 g of $CaCO_3$ and 11.93 g of CuO are placed in suspension in 100 ml of water. 172 g of 52% $HNO_3$ is added while stirring. After heating to 80° C. a clear blue solution is obtained.

80 g of dihydrated oxalic acid are dissolved separately in 50 ml of water at 80° C.; this solution is carefully neutralized with 130 g of triethylamine until a clear solution is obtained.

The blue solution is added slowly to the solution of triethylamine oxalate whilst vigorously stirring at 80° C. The pH is adjusted to 2.2 by adding triethylamine and the mixture is cooled while stirring to 10° C., maintaining this pH.

The remaining stages are identical to those described for example 1.

The first precipitate contains all of the bismuth, lead and copper and most of the strontium and calcium.

The second precipitate contains the residual strontium and calcium.

The material obtained pressed into the form of a tube with an inside diameter of 9 mm, an outside diameter of 11 mm and length of 7 cm is heat treated at a temperature below 850° C.; it yields the $Bi_{1.6}Pb_{0.4}Sr_2Ca_2Cu_3O_{10}$ primary superconductor phase. The use of precursors precipitated by the process of the invention contributes to increasing the proportion of this phase, whose critical temperature is 110 K, in the end product. The selective yield of this phase, favored by a low synthesizing temperature between 835° and 850° C., requires the use of a mixture of highly reactive precursors if the treatment time is not to become prohibitive; this condition is met by the material obtained by the process of the invention.

EXAMPLE 4

This is identical to example 3 except with regard to the pH value at the end of the first precipitation. This is carried out at a pH of 3 and this value is maintained throughout the cooling while stirring to 10° C. An abundant pale blue first precipitate is obtained containing all of the strontium, calcium and lead and most of the bismuth and copper; however, the filtrate is also blue indicating the passage into solution of $Cu^{2+}$ cations; this is the penalty to be paid for achieving total coprecipitation of the strontium and calcium in the first stage.

The filtrate is acidified to a pH value of 0.8 using a solution of oxalic acid; a blue second precipitate is obtained containing all the residual bismuth and almost all the residual copper. It is mixed with the first precipitate as in the previous examples. The mixture is treated in exactly the same way to produce the final mixture of precursors.

However, the second filtrate contains 175 mg/l of irrecoverable $Cu^{2+}$ cations so that there is stoichiometrical deviation of less than 2% in copper.

The material obtained after heat treatment as described in example 3 is found to be richer in the $Bi_{1.6}Pb_{0.4}Sr_2Ca_2Cu_3O_{10}$ phase because the calcium, fully coprecipitated in the first stage, has therefore diffused better into the $Bi_2Sr_2Ca_1Cu_2O_8$ mother structure to form a phase richer in calcium with a high critical temperature (110 K).

The invention is naturally not limited to the examples that have just been described; in particular, the soluble salts may be acetates or formates.

There is claimed:

1. Process for obtaining precursors for high critical temperature superconductor ceramics by precipitating salts which are insoluble in water comprising the following stages:
   a starting solution of soluble salts is prepared in which the cations are in the stoichiometric proportions of the required superconductor phase,
   a first full precipitation is carried out of a first series of cations at a first value of pH,
   the first precipitate obtained is filtered out and washed and the filtrate is retained,
   the pH of said filtrate is changed to a second value and the residual cations are precipitated,
   the second precipitate is filtered,
   the first and second precipitates are combined and subsequently homogenized,
   the product obtained is dried, calcined, and ground.

2. Process according to claim 1 starting with a solution of soluble salts in which said cations are in the stoichiometric proportions of said required superconductor phase, the first precipitation is carried out by adding an amine or ammonium oxalate with a first pH value less than or equal to 3, the pH of said filtrate is raised to a second value greater than 3 and said residual cations are then precipitated completely in the form of oxalates.

3. Process according to claim 2 wherein for the superconductor phases:

- $Y_1Ba_2Cu_3O_7$,
- $Y_1Ba_2Cu_4O_8$,
- $Y_{1-x}Ca_x Ba_2 Cu_4 O_{7.5-x}$ where $0.05 < x < 0.15$,
- $Y_2 Ba_4 Cu_7 O_{15}$.

said first precipitate contains all of the yttrium and copper cations and the major part of the barium cations and said second precipitate contains the residual barium cations.

4. Process according to claim 2 wherein for the superconductor phases:

$Bi_2 Sr_2 Ca_1 Cu_2O_8$,
$Bi_2 Sr_2 Ca_2 Cu_3O_8$.

said first precipitate contains all of the bismuth and copper cations and the major part of the strontium and calcium cations and the second precipitate contains the residual strontium and calcium cations.

5. Process according to claim 2 wherein for the superconductor phase $Bi_{(2-y)} Pb_y Sr_2 Ca_2 Cu_3O_{10-y/2}$ with $0.3 < y < 0.8$ said first precipitate contains all of the bismuth, copper and lead cations and the major part of the strontium and calcium cations and the second precipitate contains the residual strontium and calcium cations.

6. Process according to claim 2 wherein for the superconductor phase $Bi_{(2-y)} Sb_y Sr_2 Ca_2 Cu_3 O_{10-y}$ with 0.3 y 0.8 said first precipitate contains all the bismuth, copper and antimony cations and the major part of the strontium and calcium cations and the second precipitate contains the residual strontium and calcium cations.

7. Process according to claim 1 wherein for the superconductor phases:

$Bi_2 Sr_2 Ca_1 Cu_2 O_8$,
$Bi_2 Sr_2 Ca_2 Cu_3 O_8$, optionally with lead or antimony substituted for some of the bismuth, using a starting solution of soluble salts in which said cations are in the stoichiometric proportions of the required phase, said first precipitation is carried out at a first pH equal to at least 3 by adding an amine or ammonium oxalate, said first precipitate containing at least all of the strontium and calcium cations and the major part of the bismuth and copper, and said filtrate is then acidified by adding oxalic acid to obtain said second precipitate containing said residual cations.

8. Process according to claim 1 wherein said soluble salts are nitrates, acetates or formates.

* * * * *